United States Patent Office 3,482,693
Patented Dec. 9, 1969

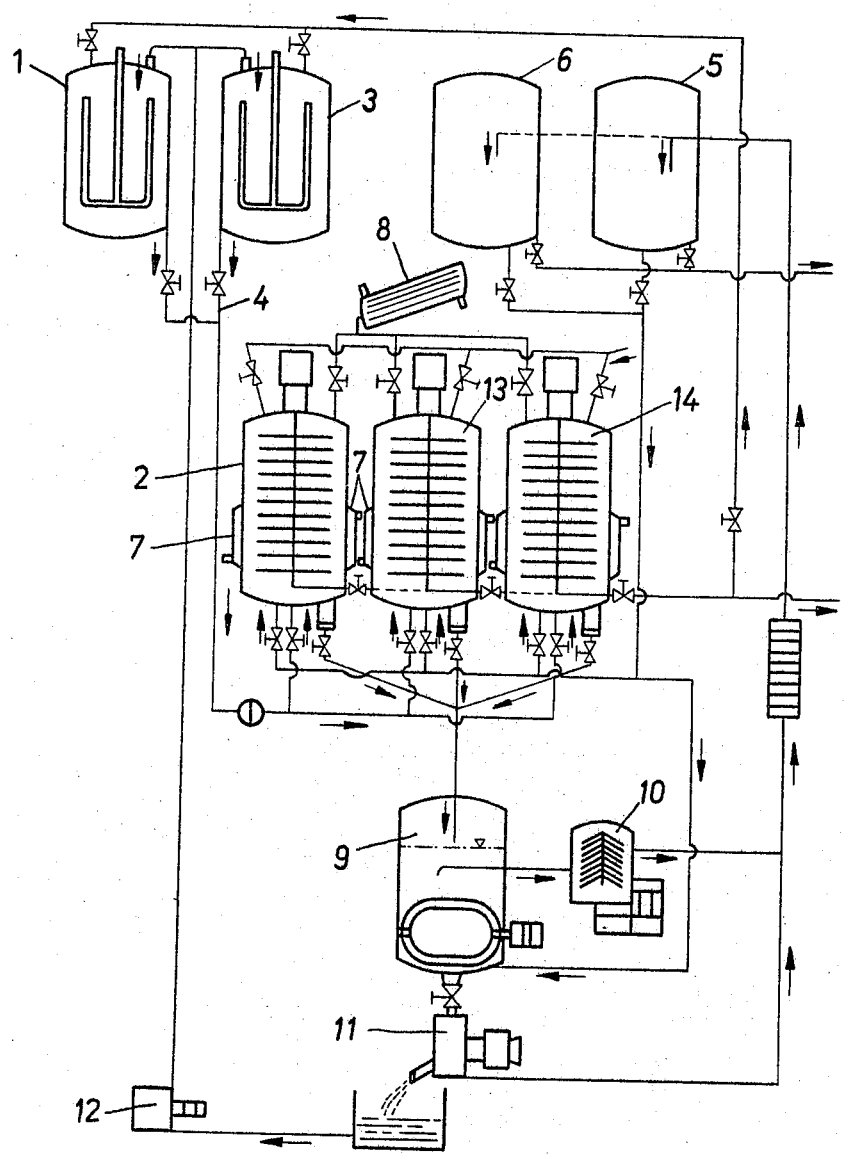

3,482,693
METHOD AND ARRANGEMENT FOR SEPARATING SOLID MATERIAL FROM A VISCOUS SUBSTANCE
Hans Müller, Erlenbach, Zurich, Switzerland
Filed Nov. 17, 1966, Ser. No. 595,277
Claims priority, application Switzerland, Nov. 18, 1965, 15,935/65, 15,936/65; Dec. 17, 1965, 17,499/65
Int. Cl. B01d 25/32
U.S. Cl. 210—67      14 Claims

ABSTRACT OF THE DISCLOSURE

In the filtration of cellulose-acetate solution in organic solvents a filter element is provided with a layer of filtering medium by circulating through the filter element a liquid containing particulate matter until this matter forms a layer of filtering medium of predetermined thickness on the filter element. Thereupon the solution to be filtered is continuously passed through the filter element with the layer of filtering medium thereon until the layer is charged with solid matter and with residual quantities of the viscous phase of the solution. Thereupon a solvent is passed through the filter element for dissolving the viscous substance and filtering the same in dissolved state through the filter element until substantially only solid matter remains in the layer of filtering medium. The layer is then removed from the filter element for separation of the solid matter from the particulate matter constituting the filtering layer.

---

The present invention relates to the separation of solid matter from a viscous substance. More specifically, the invention relates to a method of separating such solid matter from a viscous substance, and particularly by filtration of the latter. The invention also relates to an apparatus for carrying out the method.

The separation of solid matter from viscous substances, particularly by means of filtration, has long presented substantial difficulties. These problems, as well as the solution proposed in accordance with the present invention, will hereafter be discussed with reference to the difficulties which these problems present in the filtration of cellulose-acetate dissolved in organic solvents, although it should be clearly understood that this is by way of example only and that the invention is in no way limited to this particular application.

Cellulose-acetate solutions in organic solvents are used in many applications, for instance for the manufacture of acetate rayon, to make acetate foil, or to manufacture acetate-based adhesives. In many such applications, and particularly in the three specific applications just mentioned, it is necessary that the solutions have considerable viscosity and strong adhesion characteristics. Of course, the solutions initially contain various impurities, including fibers remaining from incomplete dissolution of the cellulose. Such impurities must be removed from the solution and it is here where the above-mentioned problems are encountered. To separate the impurities from the solution it is necessary to pass the latter through a suitable filter, but the high viscosity of the solution naturally provides considerable resistance to passage of the solution through the filter and necessitates the application of considerable pressure to overcome such resistance. This requires the provision of filters which are much more resistant to such pressures than would otherwise be necessary, and of course it will be obvious that this in turn means an increased expense in the construction of the filter. It also makes impossible the use of alluvia-type filtering arrangements which are otherwise very advantageous, and in which particulate material is deposited on the surface of a filter plate to form a layer thereon through which the liquid to be filtered is subsequently passed and in which impurities are retained. The reason for the impossibility of using this type of filtering arrangement with high-pressure filters for the filtration of viscous substances is that the layer of filtering medium, also known as a filtering aid, is compressed under the high pressure together with the filter cake which builds up during filtration, and thus becomes impermeable for the substance which is to be filtered.

There are, of course, other additional disadvantages. For instance, the through-put capacity of filter arrangements used for the filtration of viscous substances is very low even if very high pressures are utilized. Since modern manufacturing is of course geared to high-speed operation such low-quantity through-put is not acceptable and, in order to provide the requisite hourly through-put capacity it is necessary to provide highly elaborate filter constructions with vastly greater filtering surface areas than are necessary for less viscous substances. Again, such elaborate arrangements are expensive. Furthermore, the filter presses which are generally utilized for the filtration of viscous substances are difficult to clean and the volatile organic solvents which are used in them form vapors which are both toxic and flammable, thus representing a threat to the health and well being of the operator or operators. Not to be forgotten in this connection, is the fact that the inevitable frequent cleaning of such filter presses results in losses of cellulose-acetate, solvent, and the actual filter cloth.

It is thus obvious that the filtration of viscous substances as it has heretofore been known is unsatisfactory from the point of view of its effect on the operators as well as from a purely economic view. The industry has therefore long sought for improvements over the known methods and arrangements for the filtration of viscous substances and it is a general object of the present invention to provide such a method which overcomes the disadvantages outlined above with respect to the prior art.

It is a more specific object of the invention to provide a method for the separation of solid matter from a viscous substance in which excessive pressures during the filtration process are completely avoided.

A further object of the invention is to provide such a method in which the loss of cellulose-acetate during discarding of the separated solid matter is avoided.

A concomitant object of the invention is to provide such a method as outlined above which is highly efficient and which can be carried out with simple and therefore inexpensive equipment.

An additional object of the invention is to provide an apparatus for carrying out the method in accordance with the present invention.

One important feature of my invention as herein disclosed resides in the provision of a method for the separation of solid matter from a viscose substance, and this method comprises the step of continuously passing a viscous substance containing solid matter through a filter element. In accordance with the method the substance is passed through a filter element which includes a layer of filtering medium, that is one of the so-called "filtering aids." The viscous substance is passed through the filter element until the layer of filtering medium is at least substantially charged or clogged with solid matter and with residual quantities of the viscous substance. It is of course understood that the strong adhesive characteristics of the substances which are here under discussion will always result in such residual quantities of viscous substance being retained in the layer of filtering medium, together with the solid matter. Once the layer of filtering medium is at least substantially charged with the solid matter and the residual quantities of viscous substance, as set forth above, further feeding of the viscous substance containing solid matter is discontinued and a solvent is now passed through the filter element. This serves to dissolve the residual quantities of viscous substance and to filter the same in their dissolved state through the filter element, that is including the layer of filtering medium, whereupon they are carried away with the solvent. Thus, substantially only solid matter remains entrapped in the layer of filtering medium. Once this stage has been reached, at least the solid matter is removed from the filter element, and in accordance with the present invention this is accomplished preferably by rotating the filter element so that the layer of filtering medium together with the solid matter entrapped therein and thereby, is thrown off the filter element by the centrifugal force which develops in response to such rotation.

For reasons of economy it is naturally desirable to recirculate the solvent, which contains some of the residual quantities of viscous substance in dissolved form, to the filter element repeatedly until the desired complete or substantially complete removal of residual quantities of viscous substance has been accomplished. It is advantageous, however, to conduct a final flushing of the filter element with solvent which is completely pure and in which no viscous substance at all is dissolved. Since the highly viscous residual quantities of the viscous substance do not readily dissolve in a cold solvent it is advantageous to apply heat and, in accordance with the present invention, it is preferred to heat the housing in which the filter element is disposed. Of course, the solvent is volatile and the application of heat will result in the development of solvent vapors which are recovered by condensation and are recirculated to the filter element. In fact, such recirculated solvent condensate is particularly effective because it has been purified by undergoing a distillation process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which the single figure is a schematic representation of an arrangement for separating solid matter from a viscous substance.

As has been indicated earlier the present method and the arrangement for carrying out the method are based on the use of a filter element which utilizes a layer of filtering medium, the so-called "filtering aid." Many such filter aids are usable for the purposes at hand and pulverulent or granular minerals, such as corundum, quartz or marble, have been found to be particularly well suited. The particle size for the present application is preferred to be in the range of 50 to 150 microns, it being understood that lesser sizes result in a better filtrate but a slower rate of filtration, whereas larger sizes result in an increased through-put but in a lesser quality of the filtration. To avoid as much as possible excessive compression of the layer of filtering aid as a result of the pressure under which the viscous substance is passed through the filtering element, it is preferred that the particles be of relatively simple configuration, for example spherical.

The filter element itself consists of a non-permeable bottom plate which carries on its upper surface, against which the viscous substance impinges, a filter cloth which will usually be made of metallic material. Such filter-element constructions are known and the filter cloth serves as a support for the layer of filtering medium which is to be formed thereon. A plurality of such filter elements are usually arranged in form of a vertical stack within a housing and are provided with a common central axis which is hollow and through which the filtered substance flows off.

Coming now to a detailed discussion of the drawing it will be seen that reference numeral 1 indicates a supply tank provided with a stirrer, and this tank 1 contains a supply of liquid in which the filtering aid is suspended. To start the filtration process liquid from the supply tank 1 is fed via the pipe 4 by any suitable means, such as a pump, gas pressure or a similar expedient, into the filter 2 which comprises a housing in which there is arranged a stack of filter elements secured on a hollow common axis as has been outlined above. As this liquid from supply tank 1 passes through the filter 2 a layer of particulate material, namely of filtering aid or filtering medium, is deposited on the filter cloth of each of the filter elements disposed in the filter 2. The liquid is recirculated to the tank 1 and again passed through the filter 2 until a layer of filtering medium of requisite depth has been deposited on each of the individual filter elements in filter 2. Thereupon, feeding of liquid from the tank 1 is discontinued and a cellulose-acetate solution containing solid matter to be separated is now fed in a suitable manner from the supply tank 3 through the conduit 4 into the filter 2. It has been found advantageous to add further filtering medium to the cellulose-acetate solution since this enhances the efficiency of the filtering process.

Feeding of the cellulose-acetate solution from supply tank 3 continues until the layers of filtering medium on the individual filter elements of filter 2 are at least substantially clogged or saturated with solid material and with residual quantities of the viscous substance, the major portion of the viscous substance having been filtered through the individual filter elements in filter 2 and having been carried off for further processing. The point at which further feeding of cellulose-acetate solution to the filter 2 is discontinued will be determined in dependence upon the maximum filter resistance which is to be permitted, and upon the maximum pressure which is to be employed in forcing the cellulose-acetate solution through the filter 2. In accordance with the invention this point will be so determined that it is reached while the filter resistance, and consequently the required pressure, are still relatively low. On reaching this point, the further feeding of cellulose-acetate solution from tank 3 is terminated. Since the filter 2 will still be substantially filled with cellulose-acetate solution which has not yet been filtered it is necessary to force such remaining solution through the filter by introducing a gas under pressure, for instance nitrogen, into the filter.

Now the filter 2 contains only solid matter and residual quantities of cellulose-acetate mixture which have been retained in and on the layers of filtering medium on the individual filter elements, as well as on the walls of the housing of filter 2. To recover such residual quantities of cellulose-acetate solution a solvent contained in a storage container 5, for instance acetone, is introduced into the filter 2 via a conduit which connects the container 5 with the filter 2. During passage of the solvent through the filter 2 parts of the residual quantities of cellulose-acetate solution are further dissolved and are carried away after having been filtered through the layers of filtering medium on the individual filter elements disposed in filter 2. The solvent containing such dissolved quantities of cellulose-acetate solution passes from filter 2 into a storage container 6 and is repeatedly recirculated from the container 6 through the filter 2 and back to the container 6. During each such circulation further portions of the residual quantities of cellulose-acetate solution are dissolved in the filter 2 and carried away. When the removal of the residual quantities of cellulose-acetate solution from filter 2 is nearly complete, additional pure solvent from container 5 is introduced into the filter 2 for flushing out the last remaining traces of cellulose-acetate solution, and this solvent quantity is then also circulated into the container 6.

It has been mentioned before that the residual quantities of cellulose-acetate solution which remain in the filter 2 are highly viscous and have strong adhesive characteristics. Since they do not readily dissolve in cold solvent it is advantageous to provide a heating means 7 which heats a lower portion of the housing of the filter 2. This may be in form of a heating jacket into which steam can be introduced when heating is desired. Of course, the volatile solvent will, during such heating, form solvent vapors and with this in mind the cover of the housing of the filter 2 is provided with an opening which communicates with a cooling device 8 of suitable construction. It is not believed necessary to discuss the particular type of cooling device since many are known which can be used for this purpose. The arrangement should simply be such that the solvent vapors which enter into the cooling device 8 from the filter 2 are condensed in the cooling device 8 and are then returned in the form of pure warm solvent into the filter 2 via a suitable connecting conduit. For this purpose it is advantageous to provide a plate-type distributor within the housing of filter 2 upwardly of the upper filter element so that the thus recovered solvent is initially distributed evenly over the layer of filtering medium and the filter cake formed thereon and therein of the upper filter element, and will then pass from there to the successive elements located therebelow.

Once the cellulose-acetate residue has been completely flushed out of the filter 2, the stack of filter elements is rotated, in accordance with the present invention, about their common axis whereby the layers of filtering medium, together with the entrapped solid matter, are flung off their respective filter elements by centrifugal force. It is advantageous to add a slight quantity of solvent at this point to obtain a slurry which is capable of flowing relatively freely and which can pass into a settling tank 9 in which the filtering medium settles at the bottom. The liquid above the settled filtering medium is withdrawn and fed to a separator 10 where the solid matter and impurities are removed whereupon the remaining now purified liquid, that is solvent, is returned either to the container 5 or the container 6, depending upon its concentration. The filtering medium which has settled at the bottom of the settling tank 9 is passed on into a centrifuge 11 where it is freed of any remaining liquid and from whence it is returned to the tank 1, 3, if desired through a metering device 12 which can meter the quantity of such filtering medium which is to be introduced into one or the other of these tanks 1, 3.

Although, as has been pointed out before, the method and arrangement in accordance with the present invention increase significantly the speed of the filtration process, and thus the economy of such a process, it will be evident that precisely the considerations of economy make it desirable that an arrangement as herein described be capable of continuously filtering the cellulose-acetate solution without any such interruption as must necessarily occur during flushing of the filter with solvent, and during removal of the solid matter and the filtering medium from the filter. For this reason the arrangement herein described by way of example is provided, as evident from the drawing, with two additional filters 13 and 14 which correspond to the filter 2 and which 20 are so functionally integrated in the arrangement together with the filter 2 that one of these filters can always be in use for the filtration of the cellulose-acetate solution from the supply tank 3 while the others are going through different steps of the process, one of them for instance being flushed with solvent and the other one being freed from the accumulated solid matter and the filtering medium.

It will be obvious that certain of the components constituting the arrangement herein described are well known. For instance, the cooling device 8 has been so identified, and the means for rotating the respective stack of filter elements in the respective filters 2, 13 and 14 are equally well known and it is believed that it is not necessary to describe them any further. It is to be pointed out, in connection with removal of the solid material and the layers of filtering medium, that this is easily accomplished by centrifugal action since neither the layers of filtering medium nor the filter cake of solid material are compressed to any significant degree and since the highly efficient removal of residual quantities of cellulose-acetate solution from the individual filter elements prevents the adhesion between the particles of solid matter and of filtering medium which would otherwise make such centrifugal removal more difficult.

It will also be evident that an arrangement as herein disclosed lends itself to fully automatic operation very readily since all that is required in the way of control action is the opening and closing of various valves and the starting and stopping of motors for the pumps, the centrifuge, the filters and so on.

It should also be mentioned that under certain circumstances, certain types of filtering media are not usable. For instance, the viscosity of cellulose-acetate solution in such organic solvents as acetone may make it difficult to provide proper filtration of the solution even with the arrangement set forth herein if the solution is supplied for filtration at the concentration of approximately 22–28% which is necessary for the manufacture of acetate rayon. Under such circumstances such filtering media as kieselguhr or certain plastic granulates either cannot be used or can be used only with difficulties. However, under such circumstances the invention overcomes these problems by feeding the cellulose-acetate solution to the filter for filtration at a concentration of approximately 5–15% cellulose-acetate content. The above-mentioned problems do not occur with a concentartion of this magnitude. In accordance with the invention the filtrate obtained is subsequently simply brought to the necessary higher concentration, for instance by vaporizing requisite parts of the solvent in a so-called "thin-layer" vaporizer or in a so-called "after-vaporizer" provided with viscosity control means.

It should again be emphasized, as has been pointed out in the introductory comments, that whereas the method and the arrangement have been described with reference to their use for filtering a cellulose-acetate solution, they are not so limited since they are suitable for use with other viscous substances from which solid matter is to be separated.

It will be understood that each of the elements described above, or two or more together, may also find a useful application in other types of arrangements differing from the types described above.

While the invention has been illustrated and described and embodied in filtering arrangement, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of separating solid matter from a viscous cellulose derivative solution, comprising the steps of continuously circulating through a filter element a liquid containing particulate matter constituting a filtering medium and having a particle size between substantially 50 and 150 microns, until the particulate matter retained by said filter element forms thereon a layer of filtering medium having a predetermined thickness; continuously passing said viscous solution through the thus-formed layer of filtering medium to thereby obtain filtered viscous solution at least substantially free from solid matter, and until said layer is at least substantially charged with the retained solid matter and with residual quantities of the viscous solution; subsequently passing a solvent through said filter element for dissolving said residual quantities of viscous solution and for filtering the same in dissolved state through said filter element so that substantially only solid matter remains in said layer of filtering medium; removing at least said solid matter from said filter element; and increasing the viscosity of the filtered viscous solution.

2. A method as defined in claim 1, wherein the step of removing said solid matter from said filter element comprises removing said layer of filtering medium, and thereby said solid matter retained therein, from said filter element.

3. A method as defined in claim 2, wherein said filter element is substantially plate-shaped, and wherein the step of removing said layer of filtering medium comprises rotating said filter element so that said layer is removed therefrom under the influence of centrifugal force resulting from rotation of said filter element.

4. A method as defined in claim 1, wherein the step of passing a solvent through said filter element comprises recirculating said solvent and residual quantities of viscous solution dissolved therein through said filter element until substantially only solid matter remains in said layer of filtering medium.

5. A method as defined in claim 1, wherein said filter element is arranged in a housing through which said viscous solution and said solvent flow; and further comprising the step of heating the contents of said housing while said solvent passes through said filter element.

6. A method as defined in claim 5, wherein the step of heating the contents comprises heating said housing.

7. A method as defined in claim 5, wherein said solvent is volatile and at least partly vaporized upon being heated; and further comprising the step of condensing the resulting solvent vapor and returning the condensate to said housing.

8. A method as defined in claim 1; and further comprising the step of recovering said residual quantities of viscous solution from said solvent after filtering through said filtering element.

9. A method as defined in claim 8, wherein step of recovering said residual quantities of viscous solution comprises at least partially vaporizing said solvent.

10. A method as defined in claim 1, wherein the step of passing a solvent through said filter element comprises passing through said filter element a first quantity of solvent, subsequently a second quantity of solvent containing some of said viscous solution, and thereupon a third quantity of pure solvent free from said viscous solution and admixing all said quantities of solvent and viscous solution dissolved therein after passage thereof through said filter element.

11. A method as defined in claim 10; and further comprising the steps of increasing the viscosity of the admixed quantities of solvent and viscous solution dissolved therein, and subsequently adding said admixed quantities to said filtered viscous solution.

12. A method as defined in claim 1; and further comprising the step of recovering from said solvent after filtration of the same through said filter element the residual quantities of viscous solution dissolved therein, so that said solvent may be re-used.

13. A method as defined in claim 1; wherein said particulate matter has a particle size of between 50 and 100 microns.

14. A method as defined in claim 1; and further comprising the step of combining the filtered viscous solution and the solvent containing residual quantities of viscous solution after passage thereof through said filter element, and increasing the viscosity of the resulting combination to a predetermined extent.

References Cited

UNITED STATES PATENTS 3,352,763  11/1967  Shields _____ 210—167 X

FOREIGN PATENTS 845,131  8/1960  Great Britain.

SAMIH N. ZAHARNA, Primary Examiner

U.S. Cl. X.R.

210—75, 71, 203, 332